United States Patent
Lee et al.

(10) Patent No.: US 10,819,491 B2
(45) Date of Patent: Oct. 27, 2020

(54) METHOD AND DEVICE FOR CHANNEL STATE REPORTING

(71) Applicant: LG ELECTRONICS INC., Seoul (KR)

(72) Inventors: Hyunho Lee, Seoul (KR); Kijun Kim, Seoul (KR); Hanjun Park, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 308 days.

(21) Appl. No.: 15/300,704

(22) PCT Filed: Apr. 16, 2015

(86) PCT No.: PCT/KR2015/003834
§ 371 (c)(1),
(2) Date: Sep. 29, 2016

(87) PCT Pub. No.: WO2015/163642
PCT Pub. Date: Oct. 29, 2015

(65) Prior Publication Data
US 2017/0180100 A1 Jun. 22, 2017

Related U.S. Application Data

(60) Provisional application No. 61/984,052, filed on Apr. 25, 2014.

(51) Int. Cl.
*H04L 5/00* (2006.01)
*H04W 72/08* (2009.01)
(Continued)

(52) U.S. Cl.
CPC ............ *H04L 5/0057* (2013.01); *H04L 5/006* (2013.01); *H04L 5/0032* (2013.01);
(Continued)

(58) Field of Classification Search
CPC ... H04L 5/0057; H04L 5/0032; H04L 5/0048; H04W 72/0413; H04W 72/082; H04W 72/1284; H04W 72/1231
See application file for complete search history.

(56) References Cited

U.S. PATENT DOCUMENTS

| | | | | |
|---|---|---|---|---|
| 8,483,745 B2* | 7/2013 | Furueda | ............... | H04W 36/385 370/318 |
| 8,588,321 B2* | 11/2013 | Hoshino | ............... | H04B 7/0426 375/260 |
| 8,611,237 B2* | 12/2013 | Lee | ............... | H04W 48/08 370/252 |
| 9,325,485 B2* | 4/2016 | Li | ............... | H04W 72/04 |

(Continued)

FOREIGN PATENT DOCUMENTS

| | | |
|---|---|---|
| KR | 1020140029365 | 3/2014 |
| WO | 2012144842 | 10/2012 |

OTHER PUBLICATIONS

PCT International Application No. PCT/KR2015/003834, Written Opinion of the International Searching Authority dated Jul. 24, 2015, 18 pages.

*Primary Examiner* — Huy D Vu
*Assistant Examiner* — Bailor C. Hsu
(74) *Attorney, Agent, or Firm* — Lee Hong Degerman Kang & Waimey

(57) ABSTRACT

The present invention relates to a method for channel state reporting in a wireless communication system, wherein the method is performed by a terminal and includes the steps of: receiving a setting for a limited measurement resource, a first set of CSI subframes, or a second set of CSI subframes for channel state measurement; calculating the value of a channel state of a specific type according to whether a reference resource for the channel state measurement corresponds to the first set of CSI subframes or the second set of CSI subframes; and transmitting the calculating value of the channel state to a serving base station, wherein the value of the channel state may be one of a first type of channel (Continued)

quality indicator (CQI) that is not affected by the interference base station in the cannel are partially removed, or a third type of CQI from which the effects of the interference signal of the main interference base station are not removed.

10 Claims, 7 Drawing Sheets

(51) Int. Cl.
*H04W 72/04* (2009.01)
*H04W 72/12* (2009.01)
*H04L 5/14* (2006.01)

(52) U.S. Cl.
CPC .......... *H04L 5/0035* (2013.01); *H04L 5/0048* (2013.01); *H04L 5/0082* (2013.01); *H04L 5/0094* (2013.01); *H04W 72/0413* (2013.01); *H04W 72/082* (2013.01); *H04W 72/1284* (2013.01); *H04L 5/001* (2013.01); *H04L 5/0023* (2013.01); *H04L 5/14* (2013.01); *H04W 72/1231* (2013.01); *Y02D 70/00* (2018.01)

(56) References Cited

U.S. PATENT DOCUMENTS

| | | | | |
|---|---|---|---|---|
| 9,337,970 | B2* | 5/2016 | Hammarwall | H04L 1/0026 |
| 9,374,757 | B2* | 6/2016 | Lee | H04W 36/30 |
| 9,408,085 | B2* | 8/2016 | Abe | H04W 48/08 |
| 9,420,476 | B2* | 8/2016 | Koutsimanis | H04J 11/005 |
| 9,590,713 | B2* | 3/2017 | Davydov | H04L 5/00 |
| 9,681,425 | B2* | 6/2017 | Geirhofer | H04B 7/0621 |
| 2008/0165875 | A1* | 7/2008 | Mundarath | H04B 7/0417 375/262 |
| 2009/0168718 | A1 | 7/2009 | Wang et al. | |
| 2011/0134771 | A1 | 6/2011 | Chen et al. | |
| 2012/0127950 | A1 | 5/2012 | Chung et al. | |
| 2014/0146778 | A1* | 5/2014 | Wang | H04B 7/0626 370/329 |
| 2014/0200001 | A1* | 7/2014 | Song | H04W 36/0094 455/436 |
| 2014/0211723 | A1* | 7/2014 | Xia | H04L 5/0051 370/329 |
| 2015/0270917 | A1* | 9/2015 | Roman | H04J 11/005 370/329 |
| 2015/0282191 | A1* | 10/2015 | Luo | H04B 7/0684 455/452.1 |
| 2018/0102817 | A1* | 4/2018 | Park | H04L 5/001 |

* cited by examiner

METHOD AND DEVICE FOR CHANNEL STATE REPORTING

CROSS-REFERENCE TO RELATED APPLICATIONS

This application is the National Stage filing under 35 U.S.C. 371 of International Application No. PCT/KR2015/003834, filed on Apr. 16, 2015, which claims the benefit of U.S. Provisional Application No. 61/984,052, filed on Apr. 25, 2014, the contents of which are all hereby incorporated by reference herein in their entirety.

TECHNICAL FIELD

The present invention relates to a wireless communication system, and more particularly, to a method of reporting a channel state reflecting interference cancellation performance and apparatus for the same.

BACKGROUND ART

Various devices and technologies for a smart phone, a tablet PC and the like, requesting machine-to-machine (M2M) communication and a large amount of data transmission, have appeared and distributed. As such, the amount of data requiring a process in a cellular network is on the rapid increase. Likewise, in order to satisfy such a rapidly increasing data process requirement, a carrier aggregation technology, a cognitive radio technology and the like for efficiently using more frequency bands, and a multi-antenna technology, a multi-base station cooperation technology and the like for increasing data capacity transmitted within a limited frequency are developed. Further, a communication environment is evolving in a direction of increasing the density of nodes accessible by a nearby user device. A node means a fixed point capable of transmitting/receiving a wireless signal to/from a user device by being provided with one or more antennas. A communication system provided with nodes of a high density can provide a communication service of a higher performance to the user device by cooperation among nodes.

Such a multi-node cooperative communication scheme of performing communication with a user device using the same time-frequency resources in a plurality of nodes has a much better performance in the data throughput than the existing communication scheme of performing communication with a user device without mutual cooperation in a manner that each node independently operates as a base station.

A multi-node system performs cooperative communication using a plurality of nodes, each of which operates as a base station or an access point, an antenna, an antenna group, a radio remote header (RRH), or a radio remote unit (RRU). In the multi-node system, unlike the existing centralized antenna system having antennas concentrated on a base station, a plurality of the nodes are normally spaced apart from each other by an interval equal to or greater than a predetermined interval. A plurality of the nodes can be managed by at least one base station or at least one base station controller configured to control the operation of each node or schedule data to be transmitted/received through each node. And, each node is connected to a base station or a base station controller configured to manage the corresponding node through a cable or a dedicated line.

Such a multi-node system may be regarded as a kind of a multi-input multi-output (MIMO) system in that distributed nodes can simultaneously transmit/receive different streams so as to communicate with a single user device or a multitude of user devices. Yet, since the multi-node system transmits a signal using nodes distributed at various locations, a transmission area that should be covered by each antenna is reduced in comparison with antennas included in the existing centralized antenna system. Therefore, compared to the existing system having an MIMO technology implemented in the centralized antenna system, the multi-node system may have a reduced transmission power required for each antenna to transmit a signal. Moreover, since a transmission distance between an antenna and a user device is decreased, a path loss is reduced and a high speed transmission of data is enabled. As such, the transmission capacity and power efficiency of a cellular system can be enhanced and the communication performance of a relatively uniform quality can be satisfied irrespective of the location of a user device in a cell. Furthermore, in the multi-node system, base station(s) or base station controller (s) connected to a plurality of nodes cooperate for data transmission/reception, and thus a signal loss generated in the process of transmission is reduced. Furthermore, when nodes spaced apart from each other over a predetermined distance perform cooperative communication with a user device, correlation and interference between antennas are reduced. Therefore, according to a multi-node cooperative communication scheme, a high signal to interference-plus-noise ratio (SINR) can be obtained.

Owing to such advantages of the multi-node system, base station building costs and backhaul network maintenance costs are reduced in the next-generation mobile communication system. Further, in order to extend the service coverage and improve channel capacity and SINR, the multi-node system is used together with or substitutes the existing centralized antenna system, thereby rising as a new base of a cellular communication.

DISCLOSURE OF THE INVENTION

Technical Task

The present invention relates to a channel state reporting of a user equipment (UE), and more particularly, to a method or apparatus for reporting a channel state reflecting interference cancellation performance.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of reporting a channel state, performed by a user equipment, in a wireless communication system, including: receiving configuration for a measurement resource restricted for channel state measurement, including either a first CSI subframe set or a second CSI subframe set; calculating a value of a specific type of a channel state depending on whether a reference resource for the channel state measurement corresponds to the first CSI subframe set or the second CSI subframe set; and transmitting, to a serving base station, the calculated value of the channel state, wherein the value of the channel state includes one of a first type CQI (channel quality indicator) derived from a channel with no influence of an interference signal of a dominant interference base station within a channel, a second type CQI derived from a channel from which the influence of the interference signal of the dominant interference base station has been partly cancelled and a third type CQI derived from a channel from which the influence of the interference signal of the dominant interference base station is not cancelled at all.

Additionally or alternatively, when the reference resource for the channel state measurement is the first CSI subframe set, a first CQI may be calculated without considering interference by the dominant interference base station in the reference resource and then transmitted to the serving base station.

Additionally or alternatively, the method may further include transmitting, to the serving base station, a physical cell identifier (PCI) of the dominant interference base station determined by the user equipment together with the first type CQI.

Additionally or alternatively, the method may further include transmitting, to the serving base station, a neighbor cell identifier (NCID) associated with the dominant interference base station determined by the user equipment together with the first type CQI.

Additionally or alternatively, when the reference resource for the channel state measurement is the second CSI subframe set, the second type CQI or the third type CQI may be calculated in consideration of interference by the dominant interference base station in the reference resource and then transmitted to the serving base station.

Additionally or alternatively, whether the second type CQI or the third type CQI is to be calculated and transmitted may be preset by the serving base station.

Additionally or alternatively, the method may further include transmitting a flag indicating whether the value of the channel state is the second type CQI or the third type CQI together.

Additionally or alternatively, when each of RSRPs (reference signal received powers) of adjacent base stations of the user equipment is smaller than a threshold, the third type CQI may be calculated and transmitted.

Additionally or alternatively, the calculating the value of the channel state may include cancelling a signal of the serving base station or the dominant interference base station from a signal received on a first resource or a second resource of a subframe corresponding to the reference resource, wherein the first resource corresponds to CRS RE(s) and wherein the second resource corresponds to IMR (interference measurement resource) RE(s).

In another technical aspect of the present invention, provided herein a method of reporting a channel state, performed by a base station, in a wireless communication system, including: transmitting, to a user equipment, configuration for a measurement resource restricted for channel state measurement, including either a first CSI subframe set or a second CSI subframe set to a user equipment; receiving a value of a specific type of a channel state from the user equipment depending on whether a reference resource for the channel state measurement corresponds to the first CSI subframe set or the second CSI subframe set; and scheduling the user equipment according to the received value of the specific type of the channel state, wherein the value of the channel state includes one of a first type CQI (channel quality indicator) derived from a channel with no influence of an interference signal of a dominant interference base station within a channel, a second type CQI derived from a channel from which the influence of the interference signal of the dominant interference base station has been partly cancelled and a third type CQI derived from a channel from which the influence of the interference signal of the dominant interference base station is not cancelled at all.

Additionally or alternatively, the method may further include, when the first type CQI is received as the value of the channel state, if it is confirmed that the dominant interference base station has transmitted a signal on the reference resource, ignoring the received first type CQI.

In further another technical aspect of the present invention, provided herein a user equipment, configured to report a channel state in a wireless communication system, including: a radio frequency (RF) unit; and a processor configured to control the RF unit, wherein the processor is further configured to receive configuration for a measurement resource restricted for channel state measurement, including either a first CSI subframe set or a second CSI subframe set, calculate a value of a specific type of a channel state depending on whether a reference resource for the channel state measurement corresponds to the first CSI subframe set or the second CSI subframe set, and transmit, to a serving base station, the calculated value of the channel state, and wherein the value of the channel state is one of a first type CQI (channel quality indicator) derived from a channel with no influence of an interference signal of a dominant interference base station within a channel, a second type CQI derived from a channel from which the influence of the interference signal of the dominant interference base station has been partly cancelled and a third type CQI derived from a channel from which the influence of the interference signal of the dominant interference base station is not cancelled at all.

Additionally or alternatively, when the reference resource for the channel state measurement is a first CSI subframe set, the first type CQI may be calculated without considering interference by the dominant interference base station in the reference resource and then transmitted to the serving base station.

Additionally or alternatively, the processor may be configured to transmit, to the serving base station, a physical cell identifier (PCI) of the dominant interference base station determined by the user equipment together with the first type CQI.

Additionally or alternatively, the processor may be configured to transmit, to the serving base station, a neighbor cell identifier (NCID) associated with the dominant interference base station determined by the user equipment together with the first type CQI.

Additionally or alternatively, when the reference resource for the channel state measurement is the second CSI subframe set, the second type CQI or the third type CQI may be calculated in consideration of interference by the dominant interference base station in the reference resource and then transmitted to the serving base station.

Additionally or alternatively, whether either the second type CQI or the third type CQI is to be calculated and transmitted may be preset by the serving base station.

Additionally or alternatively, the processor may be configured to transmit a flag indicating whether the value of the channel state is the second type CQI or the third type CQI together.

Additionally or alternatively, when each of RSRPs (reference signal received powers) of adjacent base stations of the user equipment is smaller than a threshold, the third type CQI may be calculated and transmitted.

Additionally or alternatively, the processor may be configured to cancel a signal of the serving base station or the dominant interference base station from a signal received on a first resource or a second resource of a subframe corresponding to the reference resource, the first resource may correspond to CRS RE(s) and the second resource may correspond to IMR (interference measurement resource) RE(s).

The above solutions are merely part of the embodiments of the present invention, various embodiments reflecting technical features of the present invention can be drawn and understood by those having ordinary skill in the technical field from the following description.

Advantageous Effects

According to one embodiment of the present invention, a channel state report reflecting interference cancellation performance is possible, and thus system performance improvement reflecting interference cancellation performance can be expected.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
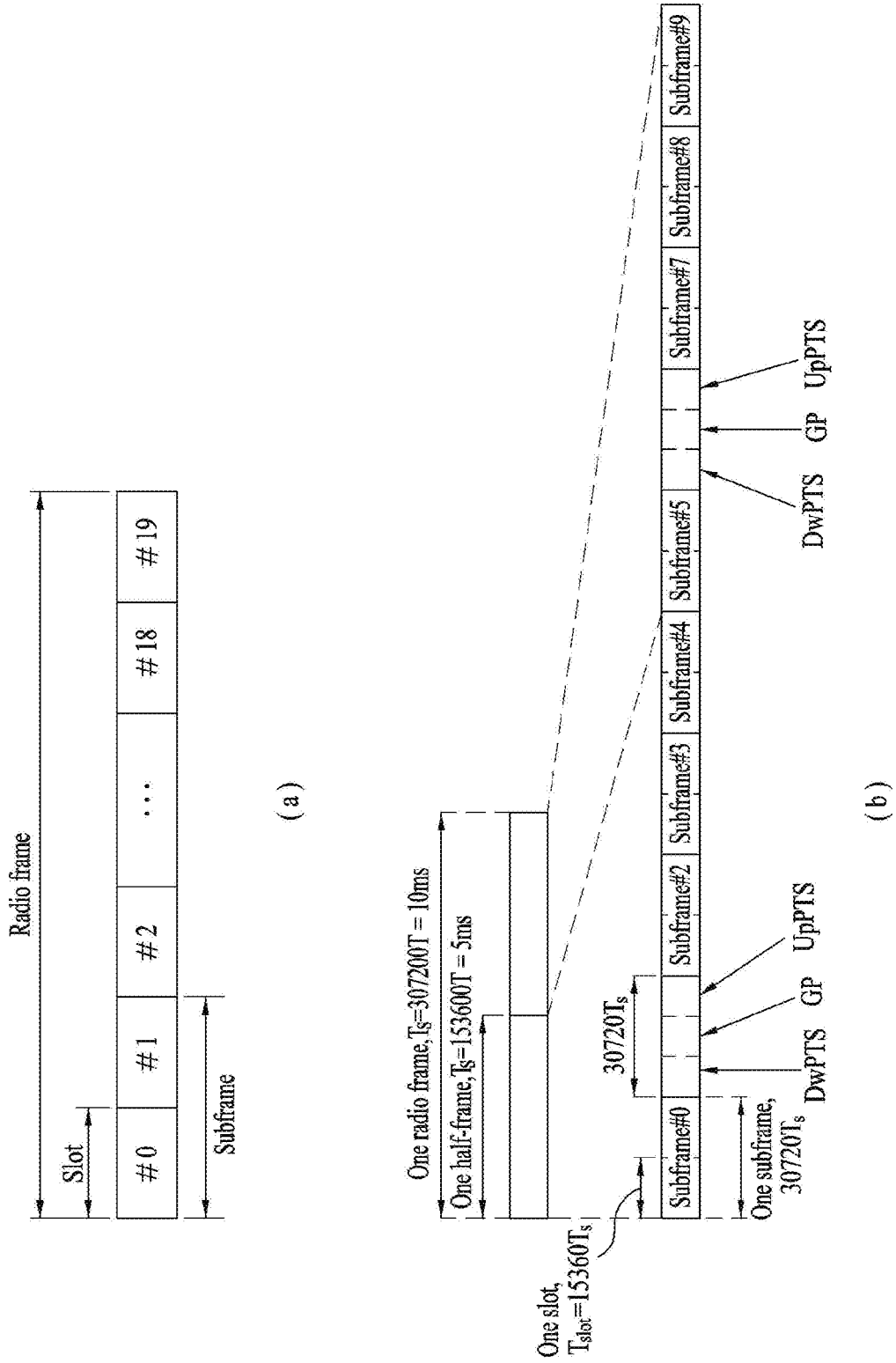
FIG. 1 is a diagram to describe one example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe config-uration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
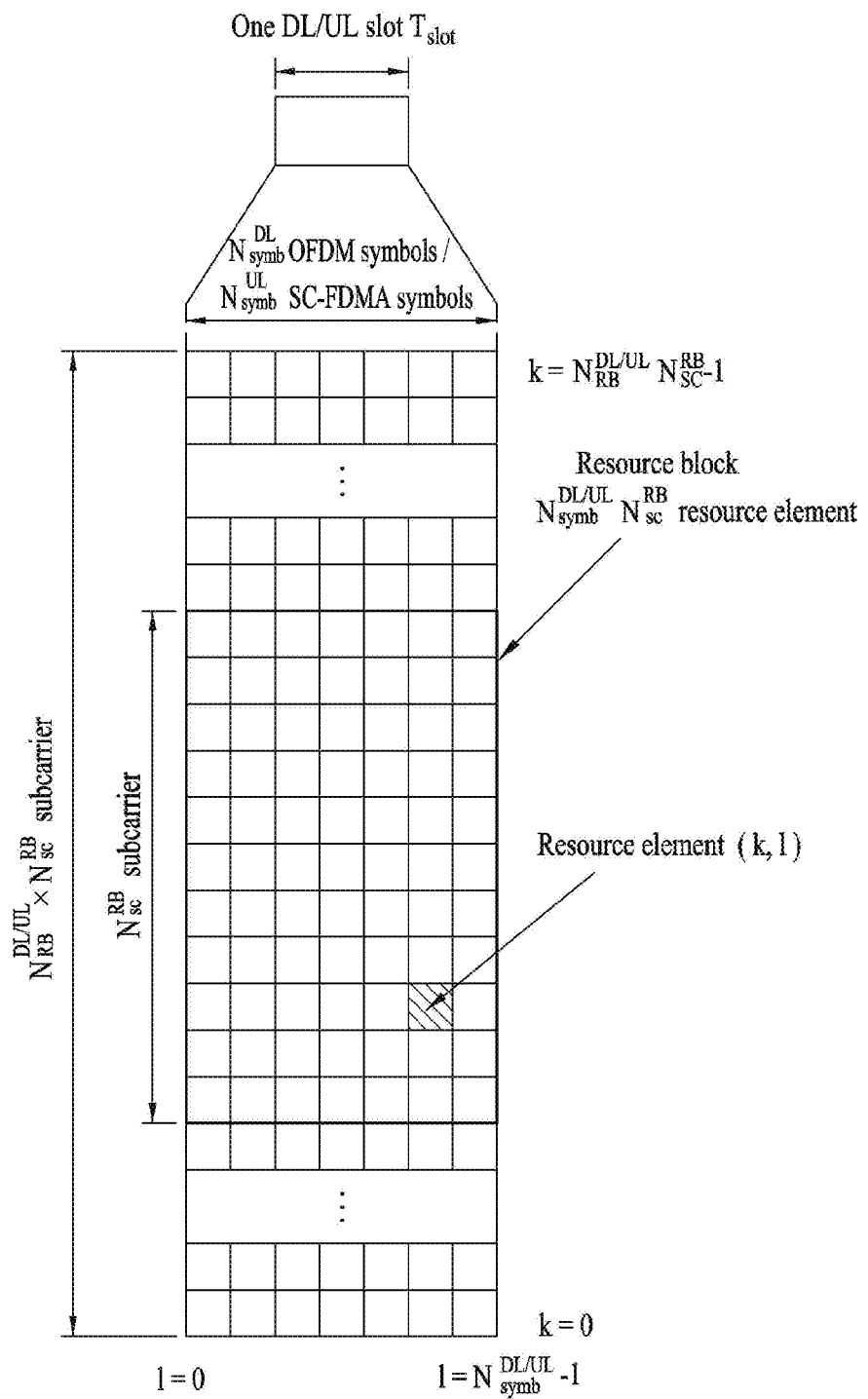
FIG. 2 is a diagram to describe one example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{DL}$ denotes the number of RBs in an uplink slot. $N_{RB}^{DL}$ and $N_{RB}^{DL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{RB}^{sc}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
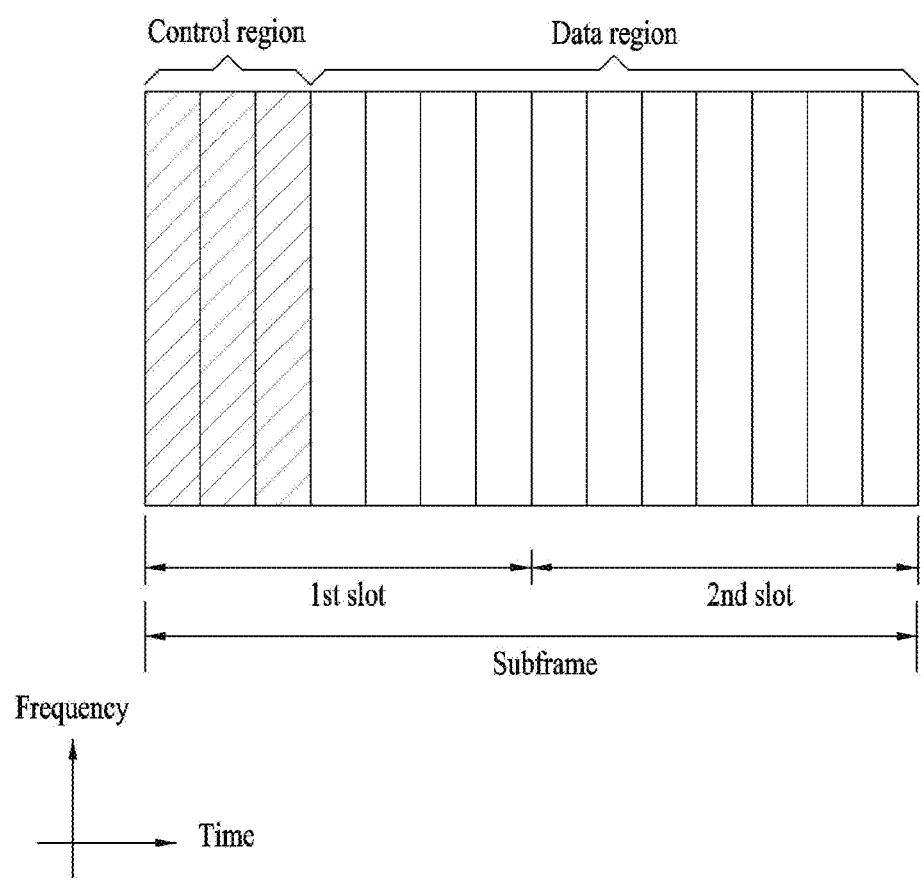
FIG. 3 is a diagram to describe a structure of a downlink (DL) subframe used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four)

OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
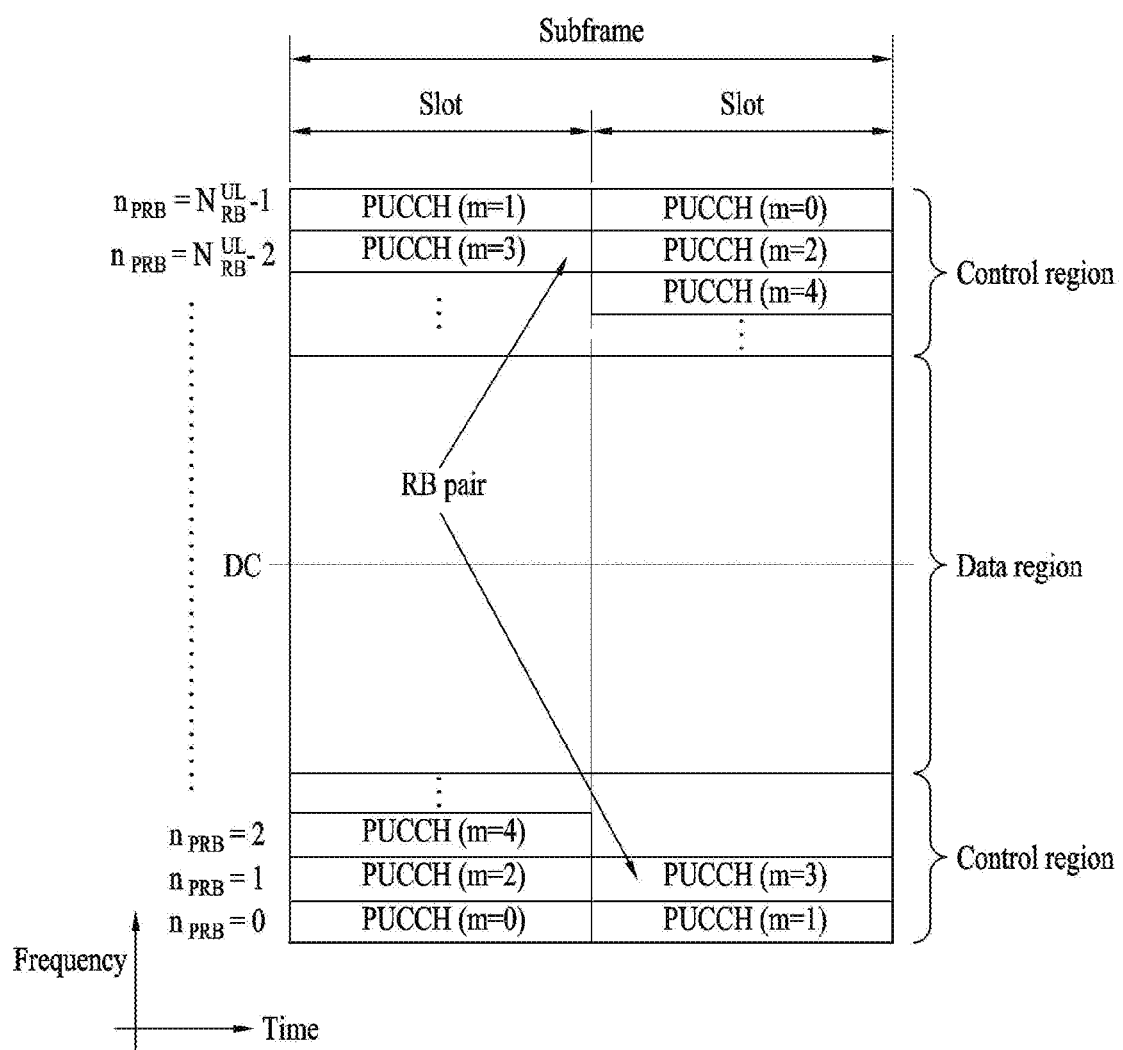
FIG. 4 is a diagram to describe a structure of an uplink (UL) subframe used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

CSI-RS(Channel State Information-Reference Signal)

In 3GPP LTE(-A), the antenna port configured to transmit CSI-RS is referred to as a CSI-RS port, and the position of a resource contained in a predetermined resource region in which CSI-RS port(s) transmit(s) the corresponding CSI-RS(s) is referred to as a CSI-RS pattern or a CSI-RS resource configuration. In addition, time-frequency resources through which CSI-RS is allocated/transmitted are referred to as CSI-RS resources. For example, a resource element (RE) used for CSI-RS transmission is referred to as CSI-RS RE. Unlike CRS in which the RE position at which CRS per antenna port is transmitted is fixed, CSI-RS has a maximum of 32 different constructions so as to reduce inter-cell interference (ICI) under a multi-cell environment including a heterogeneous network environment. Different CSI-RS constructions are made according to the number of antenna ports contained in the cell, and contiguous cells may be configured to have different structures. Unlike CRS, CSI-RS may support a maximum of 8 antenna ports (p=15, p=15, 16, p=15, . . . , 18, and p=15, . . . , 22), and CSI-RS may be defined only for $\Delta f=15$ kHz. The antenna ports (p=15, . . . , 22) may correspond to CSI-RS ports (p=0, . . . , 7), respectively. CSI-RS configuration may be varies according to the number of CSI-RS ports configured. There are 20 CSI-RS configurations if 2 CSI-RS ports are configured, there are 10 CSI-RS configurations if 4 CSI-RS ports are configured, and there are 5 CSI-RS configurations if 8 CSI-RS ports are configured. Numbers may be assigned to respective CSI-RS configurations defined by the number of CSI-RS ports.

The CSI-RS structures have nested property. The nested property may indicate that a CSI-RS structure for a large number of CSI-RS ports is used as a super set of a CSI-RS structure for a small number of CSI-RS ports. For example, REs configured to construct CSI-RS structure #0 regarding 4 CSI-RS ports are contained in resources configured to construct CSI-RS structure #0 regarding 8 CSI-RS ports.

A plurality of CSI-RSs may be used in a given cell. In the case of non-zero power CSI-RS, only CSI-RS for one structure is transmitted. In the case of zero-power CSI-RS, CSI-RS of a plurality of structures can be transmitted. From among resources corresponding to the zero-power CSI-RS, the UE proposes zero transmit (Tx) power for resources other than resources to be proposed as non-zero power CSI-RS. For example, in the case of a radio frame for TDD, no CSI-RS is transmitted in any one of a special subframe in which DL transmission and UL transmission coexist, a subframe in which a paging message is transmitted, and a subframe in which transmission of a synchronous signal, physical broadcast channel (PBCH) or system information block type1 (SIB1) collides with CSI-RS. The UE assumes that no CSI-RS is transmitted in the above subframes.

Meanwhile, time-frequency resources used by the CSI-RS port for transmission of the corresponding CSI-RS are not used for PDSCH transmission, and are not used for CSI-RS transmission of other antenna ports instead of the corresponding CSI-RS port.

Time-frequency resources used for CSI-RS transmission are not used for data transmission, such that a data throughput is reduced in proportion to the increasing CSI-RS overhead. Considering this fact, CSI-RS is not constructed every subframe, and the CSI-RS is transmitted at intervals of a predetermined transmission period corresponding to a plurality of subframes. In this case, compared to the case in which CSI-RS is transmitted every subframe, the amount of CSI-RS transmission overhead can be greatly reduced. The above-mentioned subframe will hereinafter be referred to as a CSI-RS subframe configured for CSI-RS transmission.

A base station (BS) can inform a UE of the following parameters through higher layer signaling (e.g., MAC signaling, RRC signaling, etc.).
- Number of CSI-RS ports
  CSI-RS structure
  CSI-RS subframe configuration $I_{CSI-RS}$
  CSI-RS subframe configuration period $T_{CSI-RS}$
  CSI-RS subframe offset $\Delta_{CSI-RS}$ If necessary, the BS (or eNB) may inform the UE of not only a CSI-RS configuration transmitted at zero power, but also a subframe used for transmission of the zero-power CSI-RS configuration.

CSI-IM (Interference Measurement)

Figure 5:
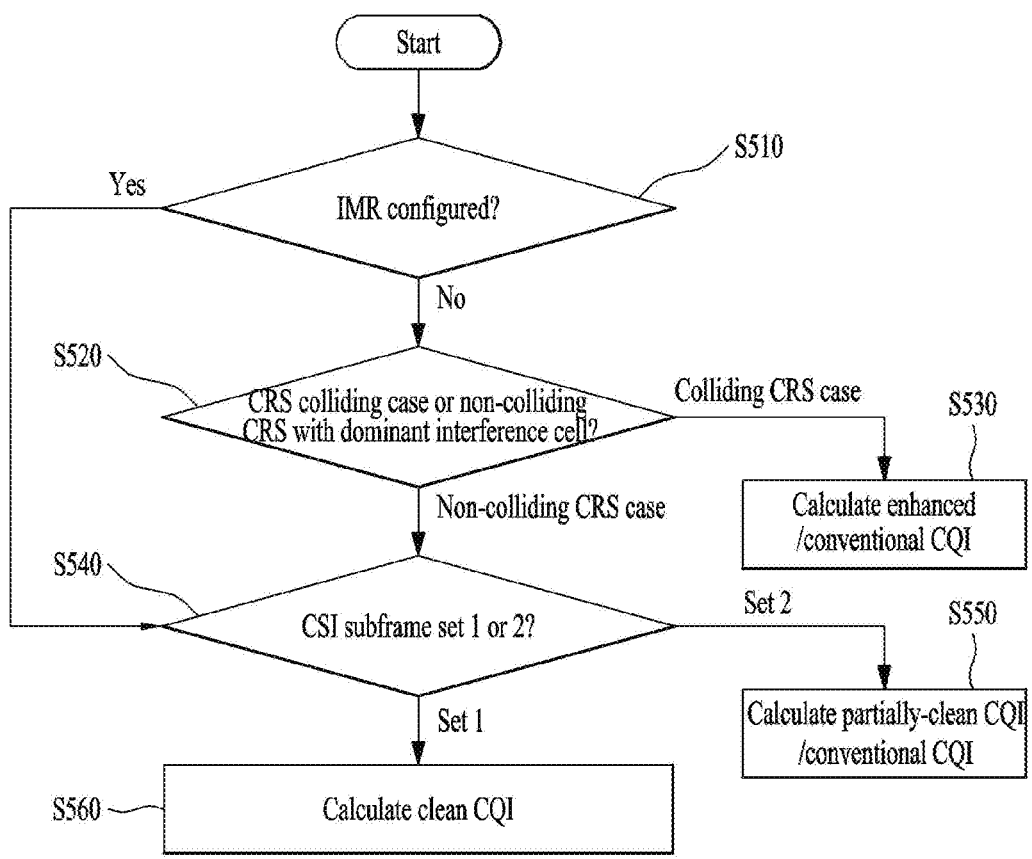
FIG. 5 is a diagram to describe a CQI-related operation according to one embodiment of the present invention.

For the 3GPP LTE Rel-11 UE, one or more CSI-IM resource structures may be configured. CSI-IM resource may be used to measure interference. The CSI-RS structure and the CSI-RS subframe structure (ICSI-RS) shown in FIG. 5 may be configured through higher layer signaling for each CSI-IM resource.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

eICIC (Enhanced Inter-Cell Interference Coordination)

An ICIC scheme for a time resource is described as follows. In case of a 3GPP LTE-A (Rel-10) system, a whole time region is divided into several subframes, and whether silencing or reduced transmission power is applied to each subframe may be indicated. ICIC on a time-axis means coordinating among other cells about how to utilize a subframe. In this case, information on the subframe utilization includes backhaul signaling or OAM (Operation Administration Management) setting, which is called ABS (almost blank subframe). ABS means a subframe in which transmission power or traffic/activity is reduced. Moreover, ABS includes a subframe having nothing transmitted therein.

ABS (Almost Blank Subframe)

ABS-related signaling via an X2 interface used for communication between eNBs is now described in detail. To increase the utilization of ABS, an eNB configures restricted measurement for a UE and transmits two different ABS-based measurement sets to the UE. That is, an eNB having received an ABS pattern of a neighboring cell, more specifically, an aggressor cell via an X2 interface configures measurement sets to a UE connected to the eNB based on the ABS pattern of the aggressor cell. In a legacy 3GPP LTE system, a UE should measure CRSs in all subframes to select an MCS, an RI, and a PMI. However, if a neighboring cell configures ABSs and an aggressor cell does not transmit any DL signal or transmits a DL signal with reduced power in subframes configured as the ABSs, interference varies according to an ABS pattern and thus the UE should perform subframe-specific measurement. To this end, an eNB indicates measurement of a specific subframe to a specific UE and the UE performs subframe-specific measurement. This is called restricted measurement. If a specific cell configures some of total subframes as ABSs to support restricted measurement, the cell should transmit information specifying the configured ABSs via an inter-eNB X2 interface. ABS signaling defined by 3GPP LTE-A largely includes ABS information and ABS status.

ABS information is shown in Table 3. ABS Pattern Info indicates subframes to be used as ABSs in the form of a bitmap. ABS Pattern Info is configured as a bitmap of 40 bits in FDD mode, and configured as a bitmap of up to 70 bits in TDD mode while the number of bits varies according to UL-DL configurations. For example, in the FDD mode, 40 bits indicate 40 subframes, and a bit value of 1 indicates an ABS while a bit value of 0 indicates a non-ABS. When restricted measurement is configured to a UE, the number of CRS antenna ports of a corresponding cell is signaled to the UE for CRS measurement. Measurement Subset is a subset of ABS Pattern Info. Like ABS Pattern Info, Measurement Subset is a bitmap of 40 bits in the FDD mode and is a bitmap of up to 70 bits in the TDD mode, which is a sort of recommended restricted measurement set for configuring restricted measurement to a UE.

TABLE 5

| IE/Group Name | Presence | Range | IE type and reference | Semantics description |
|---|---|---|---|---|
| CHOICE ABS Information | M | — | — | |
| >FDD | | | — | — |
| >>ABS Pattern Info | M | | BIT STRING (SIZE(40)) | Each position in the bitmap represents a DL subframe, for |

TABLE 5-continued

| IE/Group Name | Presence | Range | IE type and reference | Semantics description |
|---|---|---|---|---|
| | | | | which value "1" indicates 'ABS' and value "0" indicates 'non ABS'. The first position of the ABS pattern corresponds to subframe 0 in a radio frame where SFN = 0. The ABS pattern is continuously repeated in all radio frames. The maximum number of subframes is 40. |
| >>Number Of Cell-specific Antenna Ports | M | | ENUMERATED (1, 2, 4, . . .) | P (number of antenna ports for cell-specific reference signals) defined in TS 36.211 [10] |
| >>Measurement Subset | M | | BIT STRING (SIZE(40)) | Indicates a subset of the ABS Pattern Info above, and is used to configure specific measurements towards the UE |
| >TDD | | | — | — |
| >>ABS Pattern Info | M | | BIT STRING (1 . . . 70, . . .) | Each position in the bitmap represents a DL subframe for which value "1" indicates 'ABS' and value "0" indicates 'non ABS'. The maximum number of subframes depends on UL/DL subframe configuration. The maximum number of subframes is 20 for UL/DL subframe configuration 1~5; 60 for UL/DL subframe configuration 6; 70 for UL/DL subframe configuration 0. UL/DL subframe configuration defined in TS 36.211 [10]. The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . .) | P (number of antenna ports for cell-specific reference signals) defined in TS 36.211 [10] |
| >>Measurement Subset | M | | BIT STRING (1 . . . 70, . . .) | Indicates a subset of the ABS Pattern Info above, and is used to configure specific measurements towards the UE |
| >ABS Inactive | M | | NULL | Indicates that interference coordination by means of almost blank sub frames is not active |

Table 6 shows ABS status IE. ABS status IE is used to help an eNB to determine whether to change an ABS pattern. Usable ABS Pattern Info is a subset of ABS Pattern Info in the form of a bitmap, which indicates whether subframes configured as ABSs are appropriately used for interference mitigation. DL ABS status specifies a ratio between the number of DL RBs scheduled for subframes indicated by Usable ABS Pattern Info and the number of RBs allocated to UEs to be protected through ABSs among the DL RBs, which indicates how efficiently ABSs have served their purpose in a victim cell.

TABLE 6

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of resource blocks within the ABS indicated in the Usable ABS Pattern Info IE allocated by the |

TABLE 6-continued

| IE/Group Name | Presence | Range | IE type and reference | Semantics description |
|---|---|---|---|---|
| | | | | eNB2 for UEs needing protection by ABS from inter-cell interference for DL scheduling, or allocated by the eNB2 for other reasons (e.g. some control channels). The denominator of the percentage calculation is the total quantity of resource blocks within the ABS indicated in the Usable ABS Pattern Info IE. |
| CHOICE Usable ABS Information | M | | — | — |
| >FDD | | | — | — |
| >>Usable ABS Pattern Info | M | | BIT STRING (SIZE(40)) | Each position in the bitmap represents a subframe, for which value "1" indicates 'ABS that has been designated as protected from inter-cell interference by the eNB1, and available to serve this purpose for DL scheduling in the eNB2' and value "0" is used for all other subframes. The pattern represented by the bitmap is a subset of, or the same as, the corresponding ABS Pattern Info IE conveyed in the LOAD INFORMATION message from the eNB1. |
| >TDD | | | — | — |
| >>Usable ABS Pattern Info | M | | BIT STRING (1 ... 70) | Each position in the bitmap represents a subframe, for which value "1" indicates 'ABS that has been designated as protected from inter-cell interference by the eNB1, and available to serve this purpose for DL scheduling in the eNB2' and value "0" is used for all other subframes. The pattern represented by the bitmap is a subset of, or the same as, the corresponding ABS Pattern Info IE conveyed in the LOAD INFORMATION message from the eNB1. |

As described above, when a plurality of TPs placed in an aggressor-victim relationship in terms of interference predetermines their transmission patterns specifying transmission and reception timings thereof through mutual scheduling, a UE located at a geographical point communicable with all corresponding cells may communicate with a specific TP at an available transmission/reception time of the TP. Accordingly, the UE may communicate with the plurality of TPs by dividing transmission and reception timings thereof appropriately for the transmission patterns of the TPs. In this case, the UE may be connected to and communicate with each of the plurality of TPs of which transmission/reception timings are preconfigured not to overlap.

In a multi-cell environment wireless communication system having a pluraty of cells (e.g., a base station, eNB (evolved Node B) or TP (transmission point)) exist therein, NAICS (network assisted interference cancelation and supression) scheme has been discussed recently as one of inter-cell interference mitigtaion schemes. For example, currently in LTE-A standardization, an SLIC (symbol-level interference cancelation) technology of removing a transmission signal of an adjacent cell in the symbol level in order to mitigate the effects of the downlink interference signal of the adjacent cell has been discussed. The UE can receive data at a high SINR by the canceled interference, which means that the UE can quickly receive data at a transmission rate improved than before.

In order for an UE to cancel interference and receive data at a transmission rate improved than before, a feedback calculation reflecting the effects of partly or completely cancelling interference is needed unlike the existing feedback calculation. If the UE feeds back CQI (channel quality indicator) according to the existing calculation method without reflecting the effects of interference cancelation/mitigation, this can cause the result of failing to sufficiently obtaining the gain of the SLIC scheme due to an excessively conservative (low) CQI report. Therefore, in order for an UE supporting the SLIC scheme to obtain a gain using the SLIC, it is important to calculate an interference-canceled CQI and then feed back to a base station.

An example of a method of calculating an CQI reflecting the effects of NAICS, i.e., the effects of interference cancelation is shown in the table below. A UE performs an SLIC operation of removing a transmission signal of an adjacent cell significantly influencing the UE. In this case, a cell transmitting an interference cell most significantly influencing the UE is called "dominant interference cell". When CQI is calculated, CQI having no influence of the interference signal from the dominant interference cell owing to complete cancelation or non-existence is called "clean CQI".

CQI having a residual term of the influence of the interference signal after cancelation of the influence of the interference signal is called "partial-clean CQI".

TABLE 7

| | | |
|---|---|---|
| Clean CQI | IMR (interference measurement resource)-configurable UE (e.g., TM 10 UE) | A serving cell and a dominant intereference cell mute a signal in IMR RE, and an UE measures this so as to calculate CQI. |
| | IMR-configuration-impossible UE | When a serving cell and a dominant interference cell are a colliding CRS, an UE measures the amount of interference after removing the CRS coming from the serving cell and the dominant interference cell so as to calculate CQI. |
| Partial-clean CQI | IMR-configurable UE (e.g., TM 10 UE) | A serving cell mutes a signal in an IMR RE. When the PDSCH of a dominant interference cell is transmitted to the IMR RE, an UE performs BD for this so as to be removed and then measure this so as to calculate CQI. Further, it is possible that the serving cell and the domainant interference cell mute in the IMR RE, and the UE performs BD for the PDSCH parameter of the interference cell in the PDSCH RE other than the IMR RE so as to be emulated, then calculates CQI. This scheme can be regarded as a method of calculating CQI for recognizing the state of the remaining channel after the interference is partly canceled under the assumption that it is difficult to obtain CQI from which the influence of the interference of the dominant interference cell is completely canceled. |
| | IMR-configuration-impossible UE | When a serving cell and a dominant intereference cell are a colliding CRS, a UE can calculate CQI after emulation by performing BD for the PDSCH parameter of the interference cell in PDSCH RE. |
| Clean CQI | IMR (interference measurement resource)-configurable UE (e.g., TM 10 UE) | A serving cell and a dominant intereference cell mute a signal in IMR RE, and an UE measures this so as to calculate CQI. |
| | IMR-configuration-impossible UE | When a serving cell and a dominant interference cell are a colliding CRS, an UE measures the amount of interference after removing the CRS from the serving cell and the dominant interference cell so as to calculate CQI. |
| Partial-clean CQI | IMR-configurable UE (e.g., TM 10 UE) | A serving cell mutes a signal in an IMR RE. When the PDSCH of a dominant interference cell is transmitted to the IMR RE, an UE performs BD for this so as to be removed and then measure this so as to calculate CQI. Further, it is possible that the serving cell and the domainant interference cell mute in the IMR RE, and the UE performs BD for the PDSCH parameter of the interference cell in the PDSCH RE other than the IMR RE so as to be emulated, then calculates CQI. This scheme can be regarded as a method of calculating CQI for recognizing the state of the remaining channel after the interference is partly canceled under the assumption that it is difficult to obtain CQI from which the influence of the interference of the dominant interference cell is completely canceled. |
| | IMR-configuration-impossible UE | When a serving cell and a dominant intereference cell are a colliding CRS, a UE can calculate CQI after emulation by performing BD for the PDSCH parameter of the interference cell in PDSCH RE. |

A serving cell expects UEs to calculate and report a CQI reflecting the effects of NAICS or without the influence of the dominant interference cell or to calculate and report a CQI non-reflecting the effects of the NAICS. In this case, the CQI without the influence of the interference signal from the dominant interference cell or reflecting the NAICS effects for the interference signal from the dominant interference cell is called "enhanced CQI". Namely, a CQI representing the channel state that the interference due to the dominant interference cell is canceled at least partly or does not exist in the downlink channel is called "enhanced CQI". Further, when the interference due to the dominant interference cell is canceled at least partly or does not exist, this situation may be described that NAICS effects have been reflected. In contrast, the CQI non-reflecting NAICS effects can be called "conventional CQI". The enhanced CQI may be utilized as a CQI for recognizing NAICS effects by a base station and the like.

In case of an UE which is TM 10 and has been set a plurally of CSI processes, clean CQI or partial-clean CQI of Table 7 may be matched with each CSI process so as to calculate the CQI. Further, the conventional CQI may be matched with one CSI process so as to calculate the CQI. Further, an enhanced CQI reflecting different interference conditions to each CQI process may be calculated and reported.

However, according to the current LTE standards, UEs which are set a TM other than TM 10 can be set only one CSI process and cannot be allocated IMR (interference measurement resource). Further, when the serving cell and the dominant interference cell are a non-colliding CRS, such UEs cannot easily use schemes for calculating the CQI reflecting the interference cancellation effects mentioned in the above Table 7. Therefore, in the present invention, in a multi-cell environment wireless communication system having a multiple of cells (e.g., an eNB (evolved Node B) or TP (transmission point)) exist therein, when a specific UE can perform an NAICS operation of detecting and removing an adjacent cell interference signal with the help of a network, a scheme of calculating CQI reflecting the NAICS effects by the UE which is set restricted measurement for CIS measurement and a scheme of operation of a base station for supporting the same are described. The specific operation of the present invention is described below using an LTE system as an embodiment, but the application of the following operations can be extended to an arbitrary wireless communication system having an UE provided with a high-performance receiver having an interference cancelation ability.

If a restricted measurement for CSI measurement is set, namely, a subframe pattern for a CSI report is set, the UE measures and reports CSI for each subframe pattern. The CSI-restricted measurement defined in 3GPP LTE Rel-10 is as follows. Namely, if csi-SubframePatternConfig is set, the UE receives two CSI measuring patterns of csi-MeasSubframeSet1 and csi-MeasSubframeSet2. Generally one of the two CSI measuring patterns is a subframe set corresponding to the subframe in which macro base stations reduce interference to a neighbor sacrifice pico base station, and the other of the two CSI measuring patterns is a subframe set corresponding to the subframe used by the macro base stations as a general subframe.

The CSI subframe set includes a subframe set 2 corresponding to a general subframe and a subframe set 1 corresponding to ABS subframe. It can be understood from the standard content extracted below that the subframe set 1 means ABS subframe, and subframe set 2 means a general subframe (i.e., a common subframe other than ABS subframe).

CSI reference resource is CSI subframe 1, the UE can calculate clean CQI corresponding to the channel value in the state that the signal of the dominant interference cell is not included at all (S560). If the CSI reference resource is CSI subframe 2, the UE can calculate partial-clean CQI partly including the interference signal of the dominant interference cell (namely, the interference signal of the dominant interference cell was removed, but there may still be a residual term) or conventional CQI (S550).

Further, if the UE was not set IMR, the UE can determine whether the UE's serving cell and the dominant interference cell are a colliding CRS case or a non-colliding CRS case (S520). In case of the colliding CRS case, the UE can calculate enhanced CQI or conventional CQI in the corresponding CRS RE (S530). In case of the non-colliding CRS case, the UE can calculate appropriate CQI depending on whether the CSI reference resource (i.e., a resource set to measure CSI) is CSI subframe 1 or CSI subframe 2. Namely, in case of the colliding CRS case, the UE performs the above-described S540 to S560.

<CRS-Based CQI Calculation Using ABS>

When an UE reported as having NAICS ability among UEs which are set IMR-configuration-impossible TM is set restricted CSI measurement, the UE performs the following operation.

According to the current LTE standards, CRS was designed in a manner that RE allocation overlaps for each of 6 physical cell IDs. When the values taken by cell IDs (modulo 6) of the serving cell and the dominant interference cell are the same, namely, when the serving cell and the dominant interference cell are a colliding CRS case, if a UE is set restricted CSI measurement, the UE selects one of clean/partial-clean/conventional CQI methods in CRS RE and then performs calculation and reports the result of calculation. Further, a CSI subframe set may be linked to the CQI calculation method, which may be promised between the base station and the UE. For example, when the CSI reference resource corresponds to CSI subframe set 1, enhanced CQI may be promised to be calculated and

TABLE 8

RadioResourceConfigDedicated field descriptions neighCellsCRSInfo
This field contains assistance information for UE to mitigate interference from
CRS while performing RRM/RLM/CSI measurement or data demodulation. The UE forwards
the received CRS assistance information to lower layers.
When the received CRS assistance information is for a cell with CRS colliding with
that of the CRS of the cell to measure, the UE may use the CRS assistance information
to mitigate CRS interference on the subframes indicated by
measSubframePatternPCell, measSubframePatternConfigNeigh and
csi-MeasSubframeSet1. Furthermore, the UE may use CRS assistance information to
mitigate CRS interference from the cells in the IE for the demodulation purpose.

In the present invention, a method of setting restricted CSI measurement to NAICS UE and utilizing the setting in CSI calculation based on the aforementioned ABS subframe concept and restrcited measurement having been used between a sacrifice cell and an attacker cell. When an UE reported as having NAICS ability is set restricted CSI measurement, CQI is calculated with an operation as in FIG. 5.

First of all, an UE can determine whether the UE has been set IMR (S510). If the UE set been set IMR, the UE can check whether the CSI reference resource (i.e., a resource set to measure CSI) is subframe 1 or subframe 2 (S540). If the reported. When the CSI reference resource corresponds to CSI subframe set 2, conventional CQI may be promised to be calculated and reported. Further, a prescribed type of CQI may be calculated and reported for a prescribed time through RRC setting.

Further, when the serving cell and the dominant interference cell are a non-colliding CRS case, the UE calculates CQI using one of the following methods and reports the CQI, and the base station analyzes the reported CQI according to the following methods based on the CSI subframe set corresponding to the CSI reference resource, and ABS subframe pattern, and sets MCS of data.

(1) When Calculating CQI Using CSI Reference Resource Corresponding to CSI Subframe Set 1

The UE calculates CQI using CRS existing in the CSI reference resource. In this case, the UE uses only CRS other than the PDCCH area (or control area) for CQI calculation in one subframe. In case of TM9/TM10 UE, MBSFN subframe is not exempted in the validity condition determining the subframe corresponding to the CSI reference resource. If the subframe corresponding to the CSI reference resource is MBSFN subframe, the CRS signal is not transmitted to the data area, and thus TM9 UE determines that the subframe is not valid for CQI calculation and readjusts the CSI reference resource through the validity test for the previous subframes.

The UE assumes that when CQI is calculated using the CSI reference resource corresponding to CSI subframe set 1, the dominant interference cell uses ABS subframe in the corresponding subframe. Therefore, the UE can remove CRS from the serving cell and calculate clean CQI. When clean CQI is calculated using CSI reference resource tied to CSI subframe set 1, the UE does not need to perform signal processing except for removing the CRS signal coming from the serving cell, and thus the implementation complexity of the UE does not increase, which is an advantage.

If the UE calculates enhanced CQI using clean CQI scheme, this calculation is expressed as the following equation.

$$CQI = f\left(\frac{P_s}{N_{oc}}\right) \quad \text{[Equation 1]}$$

Here, f means a function of changing SINR to CQI. $P_S$ means a receive power of a desired signal from the serving cell. $N_{OC}$ means the whole receive power of the signal coming from a cell other than the dominant interference cell.

In the subframe corresponding to CSI reference resource of the reported CQI, if there is a dominant interference base station reported by the UE among adjacent base stations set as ABS subframe, the base station determines that the CQI was calculated by the above equation 1 and sets MCS for data of the UE by utilizing the CQI. In this case, the reported CQI corresponds to a value about a channel without the signal of the dominant interference base station, i.e., clean CQI, and such a clean CQI may be used for UE scheduling.

In the subframe corresponding to the CSI reference resource of the reported CQI, if there is no dominant interference base station reported by the UE among adjacent base stations corresponding to ABS subframe, the PDSCH signal of the dominant interference base station may exist in the CRS RE, and only the signal of the non-dominant adjacent base station set as ABS subframe becomes nonexistent. Therefore, the UE calculates clean CQI while thinking that the signal from the dominant interference cell is absent, but actually the UE calculates CQI in the state that the signal of the non-dominant adjacent base station set as ABS is absent, and reports the CQI. Hence, in this case, the base station does not use the CQI.

In order to determine whether to use CQI report corresponding to CSI subframe set 1, the UE reports the physical cell identifier (PCI) of the interference cell canceled by the UE (i.e., a cell considered by the UE as the dominant interference cell) together with clean CQI. If it is determined that the cell of the PCI reported in the subframe corresponding to CSI subframe set 1 has been set as ABS subframe, the base station determines that clean CQI has been appropriately reported and uses the CQI. In contrast, if it is determined that the cell of the reported PCI has been set as a general subframe, the base station does not use the CQI.

Sending PCI (9 bits) by the UE together at the time of CSI feedback may be excessive in terms of a signaling overhead. The base station may provide network assistance information of an adjacent cell to NAICS network through semistatic signaling by cells. If the base station grants a unique ID for matching each "neighbor cell information" to each adjacent cell, the UE can decrease the signaling overhead by reporting the ID of the cell, which is regarded by the UE as the dominant interference cell, together with CSI feedback. The ID is called a neighbor cell ID (NCID) for the convenience of description.

(2) When Calculating CQI Using CSI Reference Resource Corresponding to CSI Subframe Set 2

Figure 6:
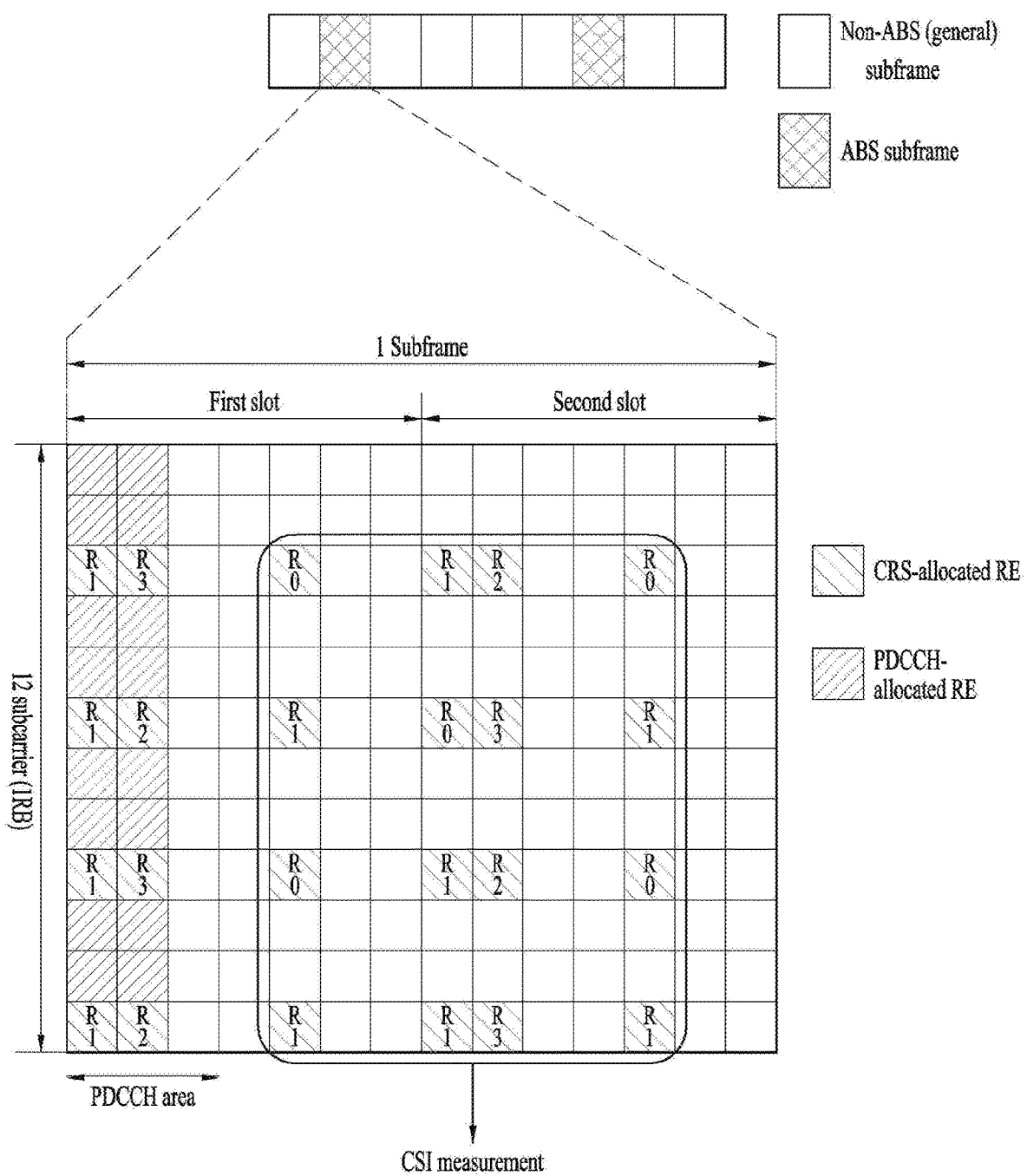
FIG. 6 is a diagram to describe one example of CRS (cell-specific reference signal)-based interference measurement.

The UE calculates CQI using CRS existing in the CSI reference resource. In this case, the UE can use only CRS except the PDCCH area (or control area) for CQI calculation in one subframe as shown in FIG. 6. The UE assumes that when CQI is calculated using CSI reference resource corresponding to CSI subframe set 2, the dominant interference cell was set as a general subframe in the subframe. In this case, the UE calculates partial-clean CQI or conventional CQI.

(2-1) Partial-Clean CQI

If the UE calculates enhanced CQI using partial-clean CQI scheme, this is expressed as the following equation.

$$CQI = f\left(\frac{P_s}{\alpha P_D + N_{oc}}\right) \quad \text{[Equation 2]}$$

In this case, α indicates a value determining residual interference power after removing an interference signal from the dominant interference cell. PD indicates power of a signal coming from the dominant interference cell. As α gets closer to 0, it means that the interference cancellation gets closer to completion. α is determined by the interference condition and UE geometry. For example, a may be determined by SNR, INR, the modulation degree of the interference signal, the number of layers of the interference signal and the like.

First of all, the UE can remove CRS from the serving cell in the CRS RE of the subframe corresponding to the CSI interference resource. Thereafter, an interference parameter is detected and the dominant interference signal is removed by utilizing the detected interference parameter. Then partial-clean CQI is calculated using the residual interference power.

(2-2) Conventional CQI

When CQI is calculated using CQI interference resource corresponding to CSI subframe set 2, the UE can calculate conventional CQI by measuring interference after removing CRS from the serving base station.

When CQI is calculated using the CSI interference resource corresponding to CSI subframe set 2, the operation of the base station and the UE may be limited to one of the following operations.

The base station may set the UE to report CQI of a prescribed type (e.g., partial-clean CQI or conventional CQI) during a predetermined subframe. As such, the UE can calculate CQI and feed back.

At the time of feedback, the UE may transmit a flag indicating whether the CQI is conventional CQI or partial-clean CQI together.

When each the RSRPs (reference signal received power) of adjacent cells reported by the UE is smaller than a predetermined threshold, it is determined that the effects of interference are not significant, whereby the UE may calculate and report conventional CQI and the base station may expect the UE to report the conventional CQI.

(3) When a Serving Base Station Informs the UE of Information about ABS

The serving base station can inform the NAICS UE of the PCI list of "adjacent cell which is ABS subframe in CSI subframe set 1" through semi-static signaling.

When such signaling is possible, if the cell regarded by the UE as the dominant interference cell is ABS subframe in CSI subframe set 1, the UE can calculate clean CQI. If the cell is not ABS subframe, the UE can calculate and report partial-clean CQI or conventional CQI.

In this case, a flag on whether the CQI is clean CQI, partial-clean CQI, or conventional CQI can be sent together. Further, the serving base station may set the type of the CQI to be calculated by the UE in each CSI subframe set and the UE may calculate and report CQI according to the type.

If there are two types of patterns of ABS subframe pattern a and ABS subframe pattern b and adjacent cells need to operate ABS using one of patterns a and b, the serving base station can link ABS subframe pattern to each CSI subframe set and set the ABS subframe pattern for the UE.

In each subframe set, in the case that the PCI list of the adjacent cell which is ABS subframe is signaled to the UE, if the cell regarded by the UE as the dominant interference cell is ABS subframe in a specific subframe set, the UE can calculate clean CQI. If the cell is not ABS subframe, the UE can calculate and report partial-clean CQI or conventional CQI and feed back information on the CQI type together.

<IMR-Based CQI Calculation Using ABS>

When the UE reported as having NAICS ability among UEs having been set IMR-configurable TM (e.g., TM10) is set restricted measurement, the UE performs the following operation.

(1) CQI is Calculated Using CSI Reference Resource Corresponding to CSI Subframe Set 1

When CQI is calculated using CSI reference resource corresponding to CSI subframe set 1, the UE assumes that the dominant interference cell was set as ABS subframe in the corresponding subframe. Therefore, the UE can promptly measure interference in IMR RE and calculate clean CQI.

The UE can report the PCI of the cell regarded by the UE as the dominant interference cell together with the calculated CQI. Further, the UE can report NCID corresponding to the aforementioned "neighbor cell information" together with CQI.

The serving base station can compare the ABS subframe pattern of the adjacent cell with the reported PCI (or PIC corresponding to the reported NCID) so as to determine one of the following illustrated cases.

When the cell determined by the UE as the dominant interference cell is a general subframe and is muted in IMR In this case, the base station determines that the reported CQI is clean CQI and sets MCS for the data of the UE.

When the cell determined by the UE as the dominant interference cell is ABS subframe and is muted in IMR In this case, the base station determines that the reported CQI is clean CQI and sets MCS for the data of the UE.

When the cell determined by the UE as the dominant interference cell is a general subframe and is not muted in IMR In this case, the base station determines that the CQI reported by the UE is conventional CQI and sets MCS for the data of the UE.

When the cell determined by the UE as the dominant interference cell is ABS subframe and is not muted in IMR This case was described to cover all cases, but such a case cannot actually happen. Even if it happens, it indicates generation of an error, and thus the base station will not use the corresponding CQI.

(2) When CQI is Calculated Using CSI Reference Resource Corresponding to CSI Subframe Set 2

The UE assumes that when CQI is calculated using CSI reference resource corresponding to CSI subframe set 2, the dominant interference cell was set a general subframe in the subframe.

First of all, the UE can remove CRS from the serving cell in CRS RE of the subframe corresponding to the CSI reference resource. Thereafter, an interference parameter can be detected and the dominant interference signal can be removed by utilizing the interference parameter. Then partial-clean CQI can be calculated using the residual interference power. Further, the UE can measure interference in IMR RE so as to calculate conventional CQI.

When CQI is calculated using the CSI reference resource corresponding to CSI subframe set 2, the operation of the base station and the UE can be limited to one of the following operations.

The base station can set the UE to report CQI of a prescribed type (e.g., partial-clean CQI or conventional CQI) during a predetermined subframe, and the UE can calculate and feed back according to the CQI.

The UE can transmit a flag indicating whether the CQI is conventional CQI or partial-clean CQI together at the time of feedback.

When each the RSRPs (reference signal received powers) of adjacent cells reported by the UE is smaller than a predetermined threshold, it is determined that the effects of interference are not significant, whereby the UE may calculate and report conventional CQI and the base station may expect the UE to report the conventional CQI.

Figure 7:
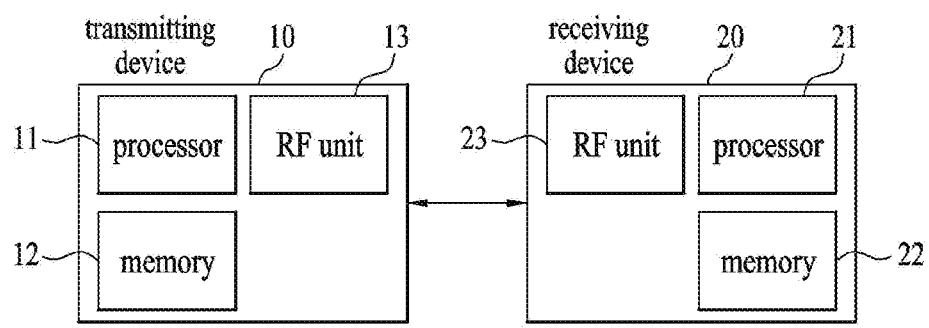
FIG. 7 is a block diagram of an apparatus for implementing embodiment(s) of the present invention.

FIG. 7 is a block diagram of a transmitting device 10 and a receiving device 20 configured to implement exemplary embodiments of the present invention. Referring to FIG. 7, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a user equipment (UE), a relay and an eNB.

What is claimed is:

1. A method for a User Equipment to report a channel state, in a wireless communication system, the method comprising:

receiving configuration information on a subframe pattern, from a serving base station, wherein the configuration information informs whether a reference resource corresponds to a first channel state indicator (CSI) subframe set or a second CSI subframe set, wherein the first CSI subframe set is related with a Almost Blank Subframe (ABS) of a dominant interference base station, and wherein the second CSI subframe set is related with a normal subframe of the dominant interference base station;

calculating a value of the channel state depending on whether the reference resource corresponds to the first CSI subframe set or the second CSI subframe set; and transmitting, to the serving base station, the value of the channel state, wherein the value of the channel state comprises one of a first type channel quality indicator (CQI) derived from a channel from which influence of an interference signal of the dominant interference base station has been completely cancelled, a second type CQI derived from a channel from which the influence of the interference signal of the dominant interference base station has been partly cancelled or a third type CQI derived from a channel from which the influence of the interference signal of the dominant interference base station is not cancelled at all, wherein the UE is not capable of an Interference Measurement Resource (IMR) configuration, wherein the base station and the dominant interference base station are in a case of a non-colliding Cell-specific Reference Signal (CRS), and wherein the value of the channel state is calculated by using a CRS in a data region, wherein based on the reference resource corresponding to the first CSI subframe set, the value of the channel state corresponds to the first type CQI, and the first type CQI is calculated by using a receive power of a desired signal from the serving base station divided by whole receive power of a signal from a base station other than the dominant interference base station, wherein based on the reference resource corresponding to the second CSI subframe set, the value of the channel state corresponds to the second type CQI when a reference signal received power (RSRP) of a neighbor base station is more than a predetermined value, and the value of the channel state corresponds to the third type CQI when the RSRP of the neighbor base station is less than or equal to the predetermined value, and the UE transmits an indicator informing whether the value of the channel state corresponds to the second type CQI or the third type CQI.

2. The method claim 1, wherein the first type CQI is calculated without considering interference by the dominant interference base station in the reference resource and then transmitted to the serving base station, when the reference resource for the channel state is the first CSI subframe set.

3. The method of claim 2, further comprising:
transmitting, to the serving base station, a physical cell identifier (PCI) of the dominant interference base station determined by the UE together with the first type CQI.

4. The method of claim 2, further comprising:
transmitting, to the serving base station, a neighbor cell identifier (NCID) associated with the dominant interference base station determined by the UE together with the first type CQI.

5. The method of claim 1, wherein either the second type CQI or the third type CQI is calculated in consideration of the interference signal of the dominant interference base station in the reference resource and then transmitted to the serving base station, when the reference resource for the channel state is the second CSI subframe set.

6. The method of claim 5, wherein whether either the second type CQI or the third type CQI is to be calculated and transmitted is preset by the serving base station.

7. The method of claim 5, further comprising transmitting a flag indicating whether the value of the channel state is the second type CQI or the third type CQI.

8. The method of claim 1, wherein the calculating the value of the channel state comprises removing either a CRS of the serving base station from a first resource or the interference signal of the dominant interference base station from a second resource,
wherein the first resource corresponds to one or more CRS resource elements (REs), and
wherein the second resource corresponds to one or more interference measurement resources (IMR REs).

9. A method of reporting a channel state, performed by a base station, in a wireless communication system, the method comprising:
transmitting, to a user equipment (UE), configuration information on a subframe pattern, wherein the configuration information informs whether a reference resource corresponds to a first channel state indicator (CSI) subframe set or a second CSI subframe set, wherein the first CSI subframe set is related with a Almost Blank Subframe (ABS) of a dominant interference base station, and wherein the second CSI subframe set is related with a normal subframe of the dominant interference base station;
receiving a value of the channel state from the UE depending on whether the reference resource corresponds to the first CSI subframe set or the second CSI subframe set; and
scheduling the user equipment according to the received value of the specific type of the channel state,
wherein the value of the channel state comprises one of a first type channel quality indicator (CQI) derived from a channel from which the influence of an interference signal of a dominant interference base station has been completely cancelled, a second type CQI derived from a channel from which the influence of the interference signal of the dominant interference base station has been partly cancelled, or a third type CQI derived from a channel from which the influence of the interference signal of the dominant interference base station is not cancelled at all,
wherein the UE is not capable of an Interference Measurement Resource (IMR) configuration, wherein the base station and the dominant interference base station are in a case of a non-colliding Cell-specific Reference Signal (CRS), and wherein the value of the channel state is calculated by using a CRS in a data region,
wherein based on the reference resource corresponding to the first CSI subframe set, the value of the channel state corresponds to the first type CQI, and the first type CQI is calculated by using a receive power of a desired signal from the serving base station divided by whole receive power of a signal from a base station other than the dominant interference base station,
wherein based on the reference resource corresponding to the second CSI subframe set, the value of the channel state corresponds to the second type CQI when a reference signal received power (RSRP) of a neighbor base station is more than a predetermined value, and the value of the channel state corresponds to the third type CQI when the RSRP of the neighbor base station is less than or equal to the predetermined value, and the UE transmits an indicator informing whether the value of the channel state corresponds to the second type CQI or the third type CQI.

10. The method of claim 9, wherein the scheduling the UE is performed by not using the first type CQI, when the first type CQI is received as the value of the channel state and when it is confirmed that the dominant interference base station has transmitted the interference signal on the reference resource.

* * * * *